United States Patent [19]

Liedtke

[11] Patent Number: 6,044,488

[45] Date of Patent: Mar. 28, 2000

[54] PROCESS FOR GENERATING A CHECK WORD FOR A BIT SEQUENCE FOR VERIFYING THE INTEGRITY AND AUTHENTICITY OF THE BIT SEQUENCE

[75] Inventor: Jochen Liedtke, Sankt Augustin, Germany

[73] Assignee: IBM, Yorktown Heights, N.Y.

[21] Appl. No.: 08/945,592

[22] PCT Filed: Feb. 28, 1997

[86] PCT No.: PCT/EP97/01021

§ 371 Date: Dec. 16, 1997

§ 102(e) Date: Dec. 16, 1997

[87] PCT Pub. No.: WO97/32417

PCT Pub. Date: Sep. 4, 1997

[30] Foreign Application Priority Data

Feb. 29, 1996 [DE] Germany ............................ 196 07 580
Mar. 6, 1996 [DE] Germany ............................ 196 08 663

[51] Int. Cl.[7] .................................................. G06F 11/10
[52] U.S. Cl. ............................................... 714/807; 380/42
[58] Field of Search .................................... 714/807, 799, 714/808, 757; 380/23, 25, 42, 43

[56] References Cited

U.S. PATENT DOCUMENTS 5,347,650  9/1994  Arditti et al. .............................. 710/5

FOREIGN PATENT DOCUMENTS 0 449 716  10/1991  European Pat. Off. .

OTHER PUBLICATIONS

IBM Technical Disclosure Bulletin, vol. 28, No. 4, Sep. 1985, pp. 1426–1427, "Authentification Technique Using Manipulation Detection Codes".

"Zur Fehlererkennungsfahigkeit Von Random Codes am Beispiel des Message Authentification Code" B. Friedrichs, pp. 145–152.

IEEE Transactions on Computers, vol. 41, No. 4, Apr. 1992, pp. 505–507, C. J. Mitchell, "Authenticating Multicast Internet Electronic Mail Messages Using a Bidirectional . . . ".

Securicom 88, Worldwide Congress on Computer and Communications Security & Protection, Jan. 1988, pp. 91–110, M. Campana et al., "Comment Utiliser Les Fonctions de Condensation . . . ".

*Primary Examiner*—Hoa T. Nguyen
*Assistant Examiner*—Shelly A Chase
*Attorney, Agent, or Firm*—Akin, Gump, Strauss, Hauer & Feld, L.L.P.

[57] ABSTRACT

The method is intended for the generation of a check word for a bit string to check the integrity and authenticity of the bit string, the bit string comprising at least one data set consisting of a plurality of data words, each having the same word length defined by a number of bits. Here, a random number is generated for each data word, the number having the same number of bits as the data words. Further, first and second operand pairs are generated, each consisting of a data word and a random number. The data word and the random number of each first operand pair are subjected to a first linking operation, while the data word and the random number of each second operand pair is subjected to a second linking operation. The results of all operations applied to the first and second operand pairs are linked, the result of this linking being the check word of this data set.

28 Claims, No Drawings

PROCESS FOR GENERATING A CHECK WORD FOR A BIT SEQUENCE FOR VERIFYING THE INTEGRITY AND AUTHENTICITY OF THE BIT SEQUENCE

The present invention refers to a method for generating a check word for a bit string to check the integrity and the authenticity of the bit string, the bit string comprising at least one set of data consisting of a plurality of data words, each having the same word length defined by a number of bits. This method will subsequently be referred to as the message digest method, the message digest being the check word. Further, the invention refers to a method for sending bit strings with secured integrity and authenticity using a message digest generated with a method of the type mentioned above.

1 Message Digest Method

In contrast to encoding methods, message digest methods do not aim at secrecy, but are used to secure the integrity of data.

To this end, a hash function is typically applied to a data set of a bit string, a message digest being calculated from the data and a secret key, i.e., a key (only) known to the sender and the receiver, also referred to as "seed". When the sender generates such a message digest and, together with the data, sends it to the receiver, the receiver can determine, whether unauthorized modifications have been made to the data (authenticity check). To do so, the receiver calculates the message digest, using the same seed, and checks, whether the newly calculated message digest corresponds to the one sent. An intruder may be able to manipulate the data, however, he usually cannot calculate a digest matching the data, since he does not dispose of the secret key (seed).

Standard methods for generating a message digest are among others N-hash, MD5 (Rivest 1992) and SHA (Metzger and Simpson 1995).

Such methods are also employed for securing data transfer via networks. For example, present efforts aim at enlarging the IP protocol correspondingly (Atkinson 1995).

A problem of the known methods when used in high speed networks is their unsatisfactory speed.

2 Object/Solution

It is an object of the present invention to provide a very fast and sufficiently secure message digest method that is particularly suitable for large amounts or streams of data.

The object is solved, according to the present invention, with a method for generating a check word for a bit string to check the integrity and authenticity of the bit string, the bit string comprising at least one set of data consisting of a plurality of data words, each having the same word length defined by a number of bits, and wherein a random number is generated for each data word, the number having the same number of bits as the data words, first and second operand pairs are generated, each consisting of a data word and a random number, the data word and the random number of each first operand pair are subjected to a first linking operation, the data word and the random number of each second operand pair are subjected to a second linking operation, and the results of all operations applied to the first and second operand pairs are linked, the result of this linking being the check word of the set of data.

In the method of the present invention, the data words are combined with random numbers, preferably by simple operations, such as modulo-$2^{wordlength}$-addition and/or modulo-$2^{wordlength}$-multiplication. The sequences in which these operations are effected and in which the random numbers are combined with the data words result from the secret key. Suitably, the key also holds information on the generation of the random numbers.

Besides the two above-mentioned linking operations, a bit-by-bit exclusive-OR operation may also be applied to the operands of the operand pairs.

The generation of the check word becomes more secure against unauthorized manipulation when the results of all operations applied to the first and second operands are linked alternately by a first linking operation and a second linking operation.

The statements made above in connection with the operations are also true for the first and second linking operations.

Preferably, the bit string comprises a plurality of data sets, each having the same number of data words, and the random number, with which the data words of the first and second operand pairs of a data set are linked, is the same for each data set. In this respect, it is advantageous to alter the sequence of the random numbers, according to which these are linked to the data words of the first and second operand pairs, per data set.

The check words obtained for the respective data sets are linked to each other, where the linking of the check words may be altered from check word to check word and/or the linking is a modulo-$2^{wordlength}$-addition, a modulo-$2^{wordlength}$-multiplication and/or a bit-by-bit exclusive-OR operation.

Preferably, the linking is selected such that, according to a first combining operation, the check word of a data set of the bit string is linked to a first combination word of the same length as the check word and that, according to a second combining operation, the result of the first combining operation is linked to a second combination word of the same length as the result of the first combining operation and that the result of the second combining operation is linked to the check word of the next data set of the bit string.

In particular, the first combining operation is a modulo-$2^{wordlength}$-multiplication, whereas the second combining operation is a modulo-$2^{wordlength}$-addition.

Using the above check word generation method, sent bit strings may be checked for their authenticity. In this case, the sender will transmit the bit string (message) and the check word. The generation of the check word on the basis of the data words of the bit string is known to the receiver; this information is the contents of the key, which must be known to both the sender and the receiver. The receiver may now generate the check word on his side and compare it to the check word received. Only when both check words match can the receiver suppose that the message is authentic.

The following is a detailed description of the invention with reference to various embodiments thereof.

3 Message Digest Methods of the Present Invention 3.1 The Basic Hash Function

Complex hash functions are to elaborate to generate message digests for large amounts and streams of data. Simple standard operations are Xor and addition modulo word size. Of the two, addition is more suitable, yet it is not too secure. One way to make addition more secure is to let nobody know what is added.

Assume, m, comprising words mi, is the message, i.e. a bit string. Thus, a simple possibility would be to calculate the digest D not by $D=\Sigma m_i$ but by $$D=\Sigma(m_i \oplus R_i),$$

wherein $R_i$ is a sequence of random or quasi-random numbers. + here and in the following represents the addition modulo $2^\omega$ (for $\omega$-bit words), and $\oplus$ represents bit-by-bit exclusive-ORing (Xor) (corresponds to the addition modulo 1).

Better than the simple sum is the alternating use of addition and Xor, such as $$D=m_1+m_2 \oplus m_3 \ldots m_i.$$

Here, neither the commutative law nor the distributive law are valid.

The most simple unauthorized manipulation of a message digest is to neutralize a change of m by a purposeful further change so that the same (original) message digest is obtained for the altered message. In order to prevent this, the individual words $m_i$ of the message m are not processed in their natural sequence, but in a randomly selected permutation $\pi$ in addition to the superposition with $R_i$. Thus, d is calculated as follows:

$$D=(m_{\pi 0}+R_0) \oplus (m_{\pi 1} \oplus R_1)+(m_{\pi 2}+R_2) \oplus$$

This method is safe, if $\pi$ together with the $R_i$ is a so-called single-shot key known only to the sender and the receiver and used only once.

For obvious reasons, single-shot keys cannot be used in practice, since they are too complex and too long. Instead, the sender transmits encoded parameters for a pseudo random numbers generator. For performance reasons the same must be rather simple, e.g., $$R_{nk+i}=R_{nk+1}+\delta_1 \; i=1, \ldots n-1, k=1, \ldots 1$$

$$R_{n(k+1)}=R_{n(k+1)-1} \times X+\delta_0,$$

where + and × represent addition and multiplication modulo $2^\omega$, $\omega$ is the word length of the data words of the bit string in bits, 1 is the number of data sets of the message m and n is the number of data words per data set.

Moreover, the indices 0 to n−1 are permutated and this sequence is repeated every n words, i.e. for each data block. In order to compensate for this regularity, the digest is multiplied every n words by a value Y and Z is added, where Y and Z are combination words having the same bit length as D.

$$D=D \times Y+Z+(m_{nk+\pi 0}) \oplus (m_{nk+\pi 1} \oplus R_{nk+1})+$$

Thus, the seed used here is a n+3 tuple $(X, Y, Z, \delta_i)$.

Unfortunately, this random-check generator is not very random. Therefore, security has to be obtained by additional means, which, however, require few operations and/or are executed only rarely.

3.2 Increase of Security

As long as the seed $(X, Y, Z, \delta_i)$ is unknown, a systematic change of the message with the digest D maintained or a new and correct calculation of D. Thus, each unauthorized manipulation has to find out $(X, Y, Z, \delta_i)$. To do so, for information theoretic reasons, at least n+3 messages with the associated digest D must be known that have all been calculated with the same seed $(X, Y, Z, \delta_i)$.

Therefore, th e seed should be changed often enough. It is feasible to use a new n+3 tuple $(X, Y, Z, \delta_i)$ for each message or even to change this seed within one message.

In a simple implementation, the sender transmits the triple (C $(X, Y, Z, \delta_i)$, m, D) per message. C refers to an optional symmetric or asymmetric encoding function encoding the seed.

To manipulate C is a standard problem of cryptography. Since the plain text $(X, Y, Z, \delta_i)$ may be randomly selected by the sender and only the key text C $(X, Y, Z, \delta_i)$ is visible, knownplaintext- and given-plaintext-manipulations are not possible. This leaves a pure ciphertext-manipulation, which stands only few chances of success, since the plaintext is random.

3.3 Message Chaining

Only one digest is calculated and transmitted for a message sequence. For calculating this digest, one or more seeds may be used. Here, the same key (in particular, the same random numbers and, if given, the same combination words) is used for a plurality of bit strings.

3.4 Multi-level Seeds

Instead of sending each seed $(X, Y, Z, \delta_i)$ explicitly, the sender transfers an encoded superseed tuple $(S_i)$ to the receiver. Both use this as an input parameter of a better random-check generator which will then calculate the actual seeds $(X, Y, Z, \delta_i)$. Thereby, the $S_i$ tuple must be calculated and sent much less often than direct seeds $(X, Y, Z, \delta_i)$.

This method can be employed in a multi-level manner by sending, e.g., $T_i$ which are then used to calculate a plurality of $S_i$.

I claim:

1. A method for generating a check word for a bit string to check the integrity and authenticity of the bit string, the bit string comprising at least one set of data comprising a plurality of data words, each having the same word length defined by a number of bits, the method comprising:

generating a random number for each data word, the number having the same number of bits as the data words, generating first and second operand pairs, each comprising a data word and a random number, combining the data word and the random number of each first operand pair by a first function, combining the data word and the random number of each second operand pair by a second function, and combining the results of all operations applied to the first and second operand pairs, the result of this combination being the check word of the set of data.

2. The method of claim 1, characterized in that the first function is a modulo-$2^{word\ length}$-addition.

3. The method of claim 1, characterized in that the second function is a bit-by-bit exclusive-OR operation.

4. The method of one of claim 1, characterized in that the results of all operations applied to the first and second operands are alternately combined by a first function and a second function.

5. The method of claim 4, characterized in that the first function is a modulo-$2^{word\ length}$-addition.

6. The method of claim 4, characterized in that the second function is a bit-by-bit exclusive-OR operation.

7. The method of claim 1, characterized in that the bit string comprises a plurality of data sets, each with the same number of data words, and that the random numbers with which the data words of the first and second operand pairs of as data set are combined, are the same for each data set.

8. The method of claim 7, characterized in that the sequence of the random numbers, in which they are combined with the data words of the first and second operand pairs, may be changed per data set.

9. The method of claim 1, characterized in that the check words obtained for the individual data sets are combined with each other.

10. The method of claim 9, characterized in that the combining of the check words may be altered from check word to check word.

11. The method of claim 10, characterized in that the first combining operation is a modulo-$2^{word\ length}$-multiplication.

12. The method of claim 10, characterized in that the second combining operation is a modulo-$2^{word\ length}$-addition.

13. The method of claim 9, characterized in that the combining is a modulo-$2^{wordlength}$-addition, a modulo-$2^{wordlength}$-multiplication and/or a bit-by-bit exclusive-OR operation.

14. The method of claim 9, characterized in that the combining is selected such that, according to a first combining operation, the check word of a data set of the bit string is combined with a first combination word of the same length as the check word and that, according to a second combining operation, the result of the first combining operation is combined with a second combination word of the same length as the result of the first combining operation and that the result of the second combining operation is combined with the check word of the next data set of the bit string.

15. A method of sending bit strings with secured integrity and/or authenticity from a sender to a receiver, the bit string comprising at least one data set comprising a plurality of data words, each having the same word length defined by a predeterminable number of bits, the method comprising:

generating a check word by means of a key known to the sender and to the receiver, generating a random number for each data word, having the same number of bits as the data words, forming first and second operand pairs, each comprising a data word and a random number, subjecting the data word and the random number of each first operand pair to a first function, subjecting the data word and the random number of each second operand pair to a second function, and combining the results of all operations applied to the first and second operand pairs, the result of this combining being the check word of the data set, and sending the bit string, together with the check word, from the sender to the receiver, wherein it is possible for the receiver to check the integrity and/or authenticity of the bit string by determining the check word from the received bit string and the key known to the receiver and by comparing the obtained check word to the check word received from the sender.

16. The method of claim 15, characterized in that the first function is a modulo-$2^{word\ length}$-addition.

17. The method of claim 15, characterized in that the second function is a bit-by-bit exclusive-OR operation.

18. The method of claim 15, characterized in that the results of all operations applied to the first and second operands are alternately linked by a first function and a second function.

19. The method of claim 18, characterized in that the second function is a bit-by-bit exclusive-OR operation.

20. The method of claim 18, characterized in that the first function is a modulo-$2^{word\ length}$-addition.

21. The method of claim 15, characterized in that the bit string comprises a plurality of data sets, each with the same number of data words, and that the random numbers with which the data words of the first and second operand pairs of as data set are combined, are the same for each data set.

22. The method of claim 21, characterized in that the sequence of the random numbers, in which they are combined with the data words of the first and second operand pairs, may be changed per data set.

23. The method of claim 15, characterized in that the check words obtained for the individual data sets are combined with each other.

24. The method of claim 23, characterized in that the combining of the check words may be altered from check word to check word.

25. The method of claim 24, characterized in that the first combining operation is a modulo-$2^{word\ length}$-multiplication.

26. The method of claim 24, characterized in that the second combining operation is a modulo-$2^{word\ length}$-addition.

27. The method of claim 23, characterized in that the combining is a modulo-$2^{wordlength}$-addition, a modulo-$2^{wordlength}$-multiplication and/or a bit-by-bit exclusive-OR operation.

28. The method of claim 23, characterized in that the combining is selected such that, according to a first combining operation, the check word of a data set of the bit string is combined with a first combination word of the same length as the check word and that, according to a second combining operation, the result of the first combining operation is combined with a second combination word of the same length as the result of the first combining operation and that the result of the second combining operation is combined with the check word of the next data set of the bit string.

* * * * *